United States Patent [19]
Danko, Jr.

[11] 3,974,706
[45] Aug. 17, 1976

[54] LEAD SCREW COUPLING ASSEMBLY

[75] Inventor: Joseph O. Danko, Jr., Baltimore, Md.

[73] Assignee: Danko-Arlington, Inc., Baltimore, Md.

[22] Filed: July 23, 1975

[21] Appl. No.: 598,387

[52] U.S. Cl. ................................. 74/89.15; 91/61
[51] Int. Cl.² ................................. F16H 29/20
[58] Field of Search ............... 74/89.15; 91/61, 170

[56] References Cited
UNITED STATES PATENTS

| | | | |
|---|---|---|---|
| 2,309,637 | 2/1943 | Fickett et al. | 91/61 X |
| 3,742,774 | 7/1973 | Blatt | 74/89.15 |
| 3,745,840 | 7/1973 | Guralnick | 74/89.15 |

*Primary Examiner*—Edgar W. Geoghegan
*Attorney, Agent, or Firm*—Cushman, Darby and Cushman

[57] ABSTRACT

A coupling assembly for coupling a threaded connection of a lead screw to apparatus to be linearly reciprocated thereby. The coupling does not allow any relative movement of the apparatus and threaded connection in directions parallel to the direction of reciprocation of the apparatus, nor does it allow any twisting relative movement therebetween. However, the coupling does allow relative movement between the connection and apparatus in planes transverse to the direction of reciprocation of the apparatus, the coupling flexing in response to force components in those directions that would be large enough to cause excessive wear of the threaded connection so that excessive wear is avoided.

18 Claims, 3 Drawing Figures

U.S. Patent   Aug. 17, 1976   3,974,706
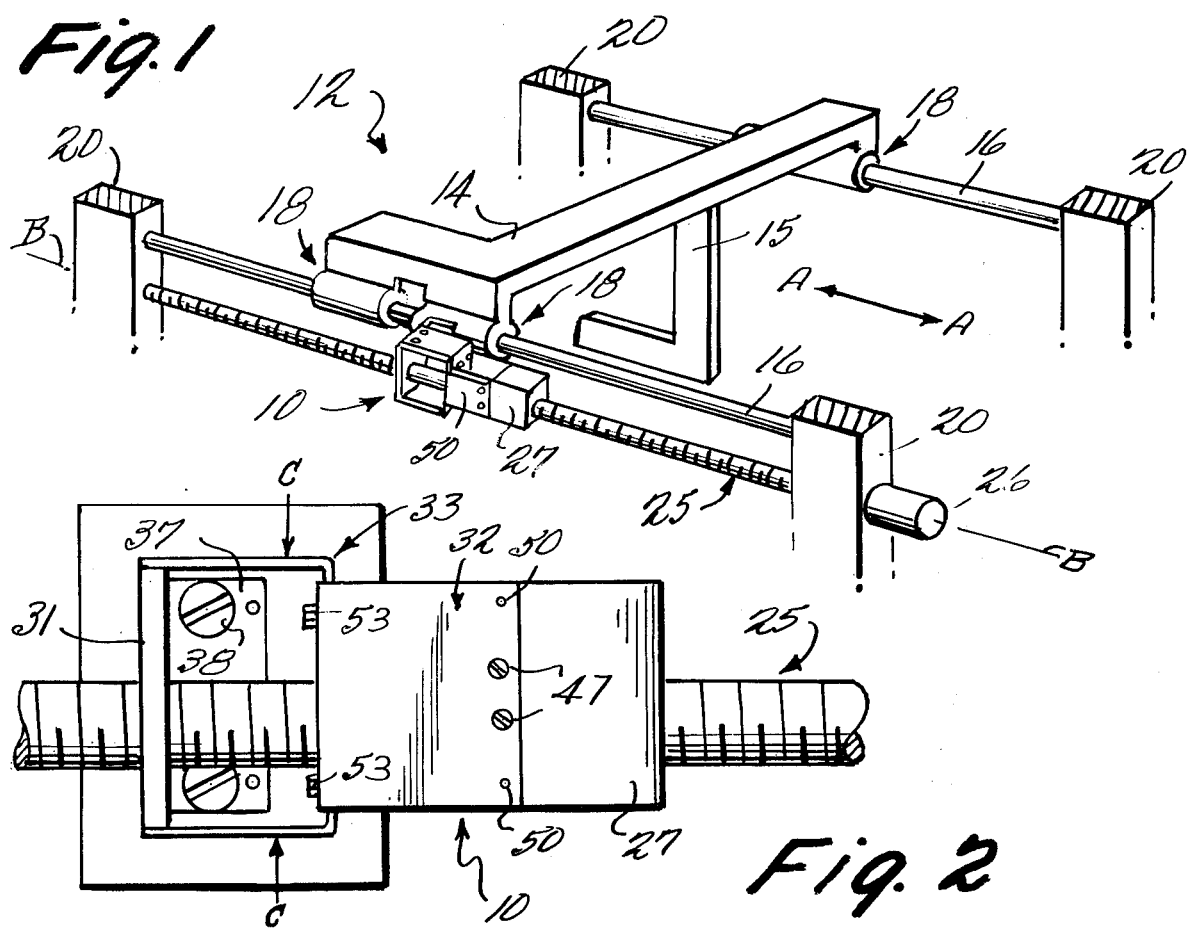
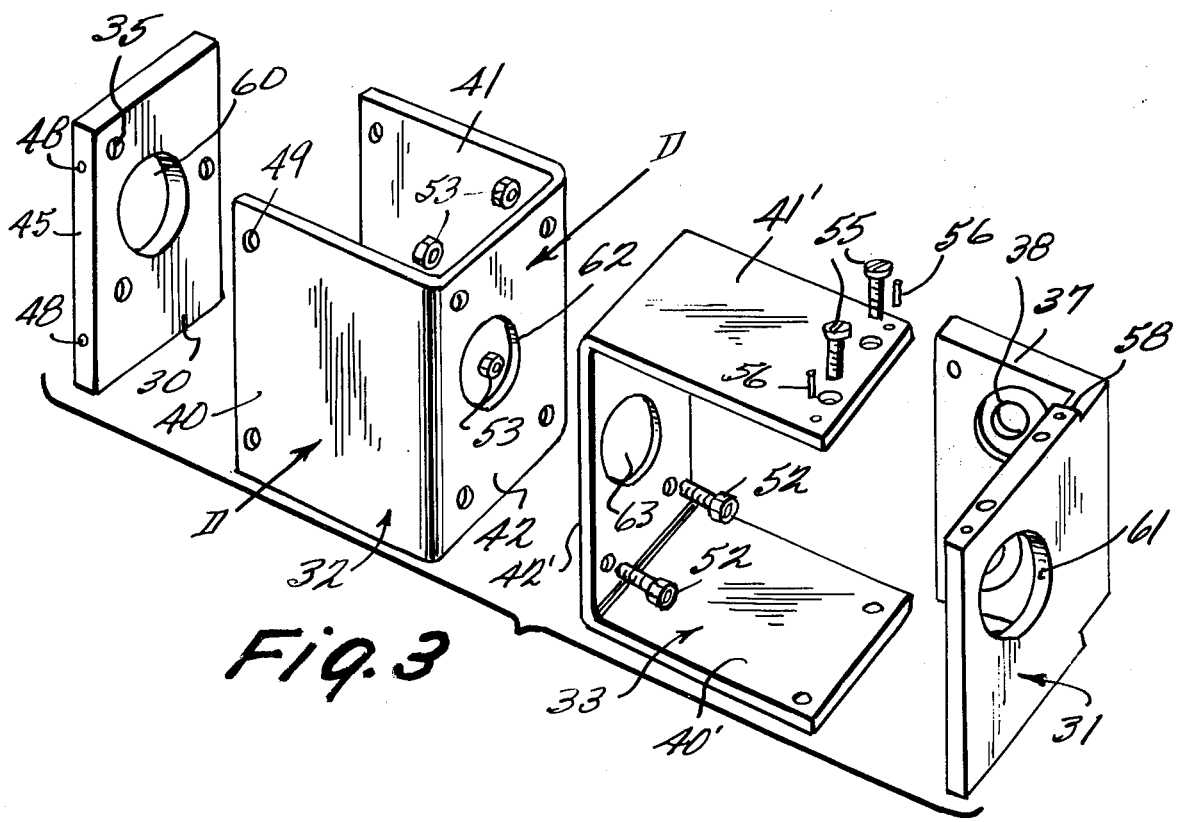

LEAD SCREW COUPLING ASSEMBLY

BACKGROUND AND SUMMARY OF THE INVENTION

The invention relates in general to a means for reciprocally moving an apparatus along a guided path, and in particular to means for connecting a reciprocal apparatus to a threadable connection on a lead screw for minimizing wear on the threadable connection.

In many instruments and assembly, it is necessary to provide true linear reciprocal movement of an element along a given path in order to perform a particular function. For instance, in apparatus for making orthophotos, such as shown in U.S. Pat. No. 3,694,072, it is necessary that a scanning element be moved precisely in linear paths in order to function properly. Positive guiding thereof is provided by a pair of spaced parallel guide rails or other similar means, which guide rails are received by collars of the scanning element platform. A drive means for moving the platform along the guide rails is provided by a ball or lead screw which is rotatable by a motor, and a conventional threaded connection that is connected to the platform and translates the rotational movement of the lead screw to linear motion. Since the threaded connection is rigidly connected to the platform, the lead screw must be made exactly parallel to the guide rails in order to prevent excessive wear on the threaded connection. Exact parallelism is not of course possible in practice, therefore in the portion of the path of movement of the threaded connection near the journalled ends of the lead screw, excessive wear of the threaded connection can result.

According to the present invention, means are provided for connecting a threaded connection associated with a lead screw to a positively guided platform or other apparatus to be linearly reciprocated thereby that minimizes the wear of the threaded connection, thus resulting in longer life thereof. According to the present invention means connecting the positively guided reciprocal apparatus and a threaded connection are provided that do not allow relative movement therebetween in the direction of movement of the apparatus or twisting relative movement (which movements would result in inaccurate operation of the apparatus), yet allow limited relative movement between the apparatus and connection in directions transverse to the direction of movement of the apparatus. The limited movement provided is normally only on the order of a few thousandths of an inch, however, it is enough to prevent excessive stresses being transferred to the threaded connection as a result of a small deviation from parallelism of the lead screw and the guide rails or the like for guiding the apparatus.

According to the present invention, the means for connecting the threadable connection to the apparatus includes a pair of rigid plate members each having an opening therethrough for receipt of the lead screw, and a pair of U-shaped members of relatively thin gauge steel. One of the rigid plate members is connected to the threaded connection, and the other is connected to the apparatus. The U-shaped members, which each include two plate-legs, each with a free end, connected together by a plate cross-member, have the free ends of the legs thereof operatively connected to the rigid plate members, one U-shaped member connected to each plate member. The U-shaped members are connected together at their cross-members, with the cross-members in face-to-face relationship, cooperating openings being formed in the cross-members for receipt of the lead screw. The tensile and compressive rigidity of the legs of the U-shaped members prevents relative movement between the apparatus and the threaded connection in the direction of movement of the apparatus, rigid locked-screw and pin or the like connections between the U-shaped members' legs and the rigid plate members prevents relative twisting, and the relative flexibility of the legs of the U-shaped members to force components transverse to the planes of the legs thereof allows limited relative movement between the threaded connection and the apparatus in directions transverse to the direction of movement of the apparatus. The coupling flexes in response to such transverse forces that are large enough that they would cause excessive wear if there was no movement allowed.

It is the primary object of the present invention to provide means for minimizing the wear of the component parts of a lead screw-threaded connection drive means for positively reciprocally guided apparatus. This and other objects of the invention will become clear from an inspection of the detailed description of the invention, and from the appended claims.

BRIEF DESCRIPTION OF THE DRAWINGS

FIG. 1 is a perspective view of an exemplary assembly according to the present invention in use in the environment of apparatus for making orthophotos;

FIG. 2 is a detailed side view of the assembly according to the present invention illustrated in FIG. 1, and FIG. 3 is an exploded perspective view of the assembly according to the present invention shown in FIGS. 1 and 2.

DETAILED DESCRIPTION OF THE DRAWINGS

An assembly 10 according to the present invention is shown in FIG. 1 in use with positively guided linearly reciprocal apparatus 12. The apparatus 12 may be any apparatus that is to be linearly driven, such as apparatus for making orthophotos, as shown in U.S. Pat. No. 3,694,072. The apparatus 12 may include a platform 14, supporting an instrument (scanning element) 15 for movement in direction A—A, the platform 14 being positively guided for movement in the direction A—A by a pair of parallel spaced guide rails 16 or the like. Collars 18 or like elements (i.e. rollers) associated with the platform 14 receive the guide rails 16 for movement therealong. The rails 16 are anchored at their ends, as by posts 20.

Means are provided for reciprocating the platform 14 of apparatus 12 along direction A—A, including a ball or lead screw 25, a motor 26, and a threaded connection 27. The ball or lead screw 25 is of conventional configuration, journalled at the ends thereof in posts 20 or the like, and rotatable about an axis of rotation B—B substantially parallel to the direction A—A. The screw 25 is rotatable by the reversible motor 26 attached to one end thereof. The threaded connection 27 translates the rotation of the lead screw 25 about axis B—B to linear reciprocal movement of the apparatus 12 in direction A—A, and the threaded connection 27 may be of any suitable conventional configuration for performing this function, such as a ball nut.

In use of the apparatus 12 with drive 25, 26, 27, in practice there will be a good deal of wear on the connection 27 if the lead screw 25 is not exactly parallel to the guide rods 16. The wear will not be great when the threaded connection 27 (and apparatus 12 connected thereto) are near the middle of the lead screw, for then the lead screw 25 may flex slightly to accommodate any misalignment (allowing slight relative movement of the connection 27 and apparatus 12) without putting excessive stress on the threaded connection 27. Near the ends of the lead screw 25, however, which are relatively stiff, being journalled in the posts 20 or the like, there is no capability for the lead screw to compensate for any misalignment. Therefore, means 10 according to the present invention are provided to compensate for such minor misalignments and thereby avoid undue stress being put on the threaded connection 27 with subsequent excessive wear thereof.

Means 10 according to the present invention prevent relative movement between the threaded connection 27 and the apparatus 12 in directions parallel to the direction A—A of movement of the apparatus 12, and prevent twisting relative movement, while allowing limited relative movement between the apparatus 12 and connection 27 in directions transverse to the direction of linear movement of the apparatus 12. By limited movement is meant a very small amount of movement relative to the dimensions of the parts and the length of travel of the apparatus 12, normally on the order of a few thousandths of an inch. Normally, the misalignment between the lead screw 25 and the rails 16 or the like is no more than a few thousandths of an inch, therefore the connecting means 10 need not have parts thereof that will deflect more than a few thousandths of an inch under normal circumstances. The ability of the connecting means to deflect a few thousandths of an inch, however, makes a big difference as far as the amount of force due to misalignment that is applied to the threaded connection 27 and therefore the amount of wear of the threaded connection 27.

The means 10, as illustrated most clearly in FIGS. 2 and 3, preferably includes a first rigid plate member 30, a second rigid plate member 31, a first U-shaped member 32, and a second U-shaped member 33. The first rigid plate member 30 is adapted to be connected to the threaded connection 27, as by screws (not shown) passing through openings 35 formed therein, at one face thereof. The second rigid plate member 31 is adapted to be connected to the apparatus 12 (as at platform 14), and may have a transverse portion 37 thereof, with screw-holes 38 therein, for that purpose. The plate members 30, 31 are preferably formed of heavy plate steel, about ¼ in. thick, and are not flexible under normal load conditions. Operatively connected to the members 30, 31 and for providing limited flexing of the connecting means 10 to allow limited relative movement between the member 27 and apparatus 12 for preventing excessive stress on the member 27, are the U-shaped members 32 and 33. Each of these members has a pair of thin sheet-legs 40, 41, and 40', 41' respectively, with a cross thin sheet member 42, 42' respectively, extending therebetween. Preferably the members 32, 33 are made of relatively thin gauge steel (i.e. 18 gauge sheet steel), and the lengths of the leg portions 40, 41, 40', 41' are fairly large relative to the thickness thereof. For instance legs 40, 41, 40', 41' may each be 1 15/16 in. long, 2⅜ in. wide, and 0.048 in. thick. Thus, under normal load conditions when the stress due to misalignment between screw 25 and rails 16 becomes too great, the members 32, 33 will flex in response to force components directed in directions C-C and D-D, thereby allowing limited relative movement between the member 27 and apparatus 12, with excessive wear of the member 27 being avoided. The legs 40, 41, 40', 41' are designed so that they will flex in response to forces that would otherwise cause excessive wear of the threaded connection. The free ends of legs 40, 41 of member 32 are connected to plate member 30 on the surface 45 thereof (the thickness of member 30), as by screws 47 passing through openings 48 and 49 in members 30 and 40 respectively. The screws 47 may be locked (staked) in place after tightening, and roll pins 50 may be provided for insuring that there is no twisting movement between the parts 30 and 32.

U-shaped member 33 is connected to members 32 and 31. It is connected to member 32 along cross portions 42, 42' thereof, and is held in place by a plurality of nuts and bolts 52, 53 or the like. To provide maximum strength, it is preferred that the face of member cross portion 42' facing the member 31 abut (be in face-to-face engagement with) the face of cross portion 32 that faces member 30. The legs 41', 40' of member 33 are connected to plate member 31 at the free ends thereof, such as by staked screws 55 and roll pins 56 passing through cooperating openings formed in legs 40', 41' and portion (thickness) 58 of member 31. Corresponding openings 60, 61, 62, and 63 formed in members 30, 31, 32, and 33 respectively are slightly larger in diameter than the diameter of the lead screw 25, and allow the lead screw to pass through the assembly 10 when it is in operative relationship with the part 27 and apparatus 12.

It will be seen that when the means 10 connects member 27 and apparatus 12, the legs 40, 41 of U-shaped member 32 extend transversely to the legs 40', 41' of member 33. To compensate for misalignment between the screw 25 and guide rails 16, legs 40, 41 will flex slightly in response to force components in the direction C-C, and legs 40', 41' will flex slightly in response to force components in the direction D—D, larger than a predetermined amount (that amount that would cause excessive wear of the threaded connection 27). However, due to the tensile rigidity of the legs 40, 41, 40', 41', and the rigidity of the members 30, 31, no relative movement will be allowed between connection 27 and apparatus 12 in the direction A—A, and due to the positive locking of the members 30, 31 to legs 40, 41 and 40', 41' respectively (by staked screws and roll pins), no relative twisting movement between the connection 27 and apparatus 12 (and no twisting of the means 10) will be allowed. Thus it will be seen that an assembly has been herein illustrated and described that fulfills all the objects of the present invention.

Ball screw manufacturers recommend that the ball nut (27) be supported to stabilize the ball screw (25) during rotation thereof. The coupling 10 according to the present invention does offer some support for this purpose. The further the ball nut 27 moves in the directions transverse to the direction of movement A—A of the ball nut 27, the stiffer the support for the ball screw becomes. Thus, the coupling 10, in practice, allows the critical speed of the ball screw 25 to remain nearly as high as it would be if the ball nut 27 were rigidly supported.

While the invention has been herein shown and described in what is presently conceived to be the most practical and preferred embodiment, it will be obvious to one of ordinary skill in the art that many modifications may be made thereof within the scope of the invention, which scope is to be accorded the broadest interpretation of the appended claims so as to encompass all equivalent structures and devices.

What is claimed is:

1. In a combination including apparatus mounted for linear reciprocal guided movement along a first path in a first direction, an assembly for moving said apparatus in said first direction along said first path, said assembly comprising
   a rotatable lead screw,
   a threadable connection mounted on said lead screw,
   means for rotating said lead screw to reciprocate said threadable connection mounted thereon in a direction substantially parallel to said first direction in a second path of movement, substantially parallel to said first path of movement, and
   means for connecting said threadable connection to said apparatus for preventing twisting movement or movement parallel to said first direction of movement of said threadable connection relative to said apparatus along the whole of said first and second paths of movement, but allowing limited movement of said threadable connection relative to said apparatus in directions transverse to said first direction along the whole of said first and second paths of movement, so that wear on said threadable connection will be minimized when force components in said transverse directions are exerted due to small deviations in parallelism of said first and second paths.

2. An assembly as recited in claim 1 wherein said means for connecting said threadable connection to said apparatus comprises a first rigid plate member connected to said threadable connection and having an opening therethrough for receipt of said lead screw, a second rigid plate member connected to said apparatus and having an opening therethrough for receipt of said lead screw, and first and second U-shaped members connecting said first and second rigid plate members.

3. An assembly as recited in claim 2 wherein each of said U-shaped members comprises a pair of sheet-leg portions connected by a sheet cross-portion, each said sheet cross-portion having an opening therethrough for receipt of said lead screw, and wherein said sheet cross-portions of said first and second U-shaped members are affixed together in face-to-face relationship with said openings therethrough aligned.

4. An assembly as recited in claim 3 wherein said U-shaped members are made out of relatively thin sheet steel, said sheet-leg portions having a large length compared to the thickness thereof so that limited flexing thereof is possible responsive to force components perpendicular to the surfaces thereof.

5. A combination as recited in claim 3 wherein each of said sheet-leg portions of said U-shaped members is connected to a rigid plate member at the free end thereof, each rigid plate member being received between sheet-leg portions of a U-shaped member.

6. An assembly as recited in claim 5 further comprising means for connecting each free end of a sheet-leg portion of a U-shaped member to a rigid plate member, said connecting means comprising a pair of screws, means for fixing said screws in a connecting position, and accessory means for positively fixing said members together.

7. An assembly as recited in claim 2 wherein said apparatus comprises a platform and at least one substantially parallel guide rail elongated in said first direction for guiding said platform for reciprocation in said first direction, said lead screw being substantially parallel to said guide rail.

8. An assembly as recited in claim 3 wherein the sheet-leg portions of said first U-shaped member are disposed in planes perpendicular to the planes in which the sheet-leg portions of the second U-shaped members are disposed.

9. An assembly as recited in claim 3 wherein said first U-shaped member is connected to said first plate member, said cross-portion of said first U-shaped member being generally parallel to said rigid plate member, and wherein said second U-shaped member is connected to said second rigid plate member, said cross-portion of said second U-shaped member being generally parallel to said second rigid plate member, and wherein the face of said cross-portion of said first U-shaped member facing said first rigid plate member is affixed in face-to-face relationship with the face of said cross-portion of said second U-shaped member facing said second rigid plate member.

10. An assembly as recited in claim 1 wherein said apparatus comprises a platform and at least one substantially parallel guide rail elongated in said first direction for guiding said platform for reciprocation in said first direction, said lead screw being substantially parallel to said guide rail.

11. A coupling for mechanically connecting a threadable connection threadably engaged for reciprocal movement along the axis of a rotatable screw to apparatus mounted for linear reciprocal guided movement substantially parallel to the axis of said screw, said coupling comprising
    first means adapted for rigid connection to said threadable connection,
    second means adapted for rigid connection to said mounted apparatus, and
    third means connecting said first and second means for preventing torsional movement therebetween and for preventing reciprocal movement therebetween in a direction substantially parallel to said axis while at the same time permitting limited translational movement therebetween in mutually perpendicular directions transverse to said axis such that wear on said threadable connection will be minimized when force components in said transverse directions are exerted due to small deviations in parallelism of said axis and said substantially parallel movement of said mounted apparatus.

12. A coupling as recited in claim 11 wherein:
    said first means comprises a first rigid plate member adapted for connection to said threadable connection and having an opening therethrough for receipt of said screw,
    said second means comprises a second rigid plate member adapted for connection to said mounted apparatus and having an opening therethrough for receipt of said screw, and
    said third means comprises first and second U-shaped members connecting said first and second rigid plate members.

13. A coupling as recited in claim 12 wherein each of said U-shaped members comprises a pair of sheet-leg portions connected by a sheet cross-portion, each said sheet cross-portions having an opening therethrough for receipt of said screw, and wherein said sheet cross-portions of said first and second U-shaped members are affixed together in face-to-face relationship with said openings therethrough aligned.

14. A coupling as recited in claim 13 wherein said U-shaped members are made out of relatively thin sheet steel, said sheet-leg portions having a large length compared to the thickness thereof so that limited flexing thereof is possible responsive to force components perpendicular to the surfaces thereof.

15. A coupling as recited in claim 13 wherein each of said sheet-leg portions of said U-shaped members is connected to a rigid plate member at the free end thereof, each rigid plate member being received between sheet-leg portions of a U-shaped member.

16. A coupling as recited in claim 15 further comprising means for connecting each free end of a sheet-leg portion of a U-shaped member to a rigid plate member, said connecting means comprising a pair of fastening screws, means for fixing said fastening screws in a connecting position, and accessory means for positively fixing said members together.

17. A coupling as recited in claim 13 wherein the sheet-leg portions of said first U-shaped member are disposed in planes perpendicular to the planes in which the sheet-leg portions of the second U-shaped members are disposed.

18. A coupling as recited in claim 13 wherein said first U-shaped member is connected to said first plate member, said cross-portion of said first U-shaped member being generally parallel to said rigid plate member, and wherein said second U-shaped member is connected to said second rigid plate member, said cross-portion of said second U-shaped member being generally parallel to said second rigid plate member, and wherein the face of said cross-portion of said first U-shaped member facing said first rigid plate member is affixed in face-to-face relationship with the face of said cross-portion of said second U-shaped member facing said second rigid plate member.

* * * * *